(12) United States Patent
Helkey et al.

(10) Patent No.: US 6,560,384 B1
(45) Date of Patent: May 6, 2003

(54) OPTICAL SWITCH HAVING MIRRORS ARRANGED TO ACCOMMODATE FREEDOM OF MOVEMENT

(75) Inventors: Roger Jonathan Helkey, Montecito, CA (US); Herbert Paul Koenig, San Jose, CA (US); John Edward Bowers, Santa Barbara, CA (US); Robert Kehl Sink, Santa Barbara, CA (US)

(73) Assignee: Calient Networks, Inc., Goleta, CA (US)

(*) Notice: Subject to any disclaimer, the term of this patent is extended or adjusted under 35 U.S.C. 154(b) by 0 days.

(21) Appl. No.: 09/586,663

(22) Filed: Jun. 1, 2000

(51) Int. Cl.$^7$ .................................................. G02B 6/26
(52) U.S. Cl. .............................. 385/18; 385/16; 385/17
(58) Field of Search ................................ 385/16, 17, 18

(56) References Cited

U.S. PATENT DOCUMENTS 3,492,484 A    1/1970  Iti
3,493,820 A    2/1970  Rosvold (List continued on next page.)

FOREIGN PATENT DOCUMENTS

DE    19757181 A1    7/1999
DE    19800745 A1    7/1999

(List continued on next page.)

OTHER PUBLICATIONS

Robert E. Mihailovich et al., "Single–Crystal Silicon Torsional Resonators," School of Electrical Engineering, Cornell University, Ithaca, NY, IEEE, pp. 184–188 (1993).
Janusz Bryzek, Kurt Petersen, & Wendell McCulley, "Micromachines on the March," IEEE Spectrum, pp. 20–31, (May 1994).

"Lucent's New All–Optical Router Uses Bell Labs Microscopic Mirrors," Bells Labs Press release, pp. 1–4, Nov. 10, 1999.
M. Adrian Michalicek, Wenge Zhang, Kevin F. Harsh, Victor M. Bright, and Y.C. Lee, "Micromirror Arrays Fabricated by Flip–Chip Assembly," Part of the SPIE Conference on Miniaturizes Systems with Micro–Optics and MEMs, Santa Clara, SPIE vol. 3878, pp. 68–79, (Sep. 1999).
Larry J. Hornbeck, "Digital Light Processing for High–Brightness, High–Resolution Applications." SPIE vol. 3013, San Jose, CA, pp. 27–40, (Feb. 1997).
Timothy J. Broshnihan, James M. Bustillo, Albert P. Pisano & Roger T. Howe, "Embedded Interconnect & Electrical Isolation for High–Aspect–Ratio, SOI Inertial Instruments," Berkeley Sensor & Actuator Sensor, pp. 637–640, Transducers '97, 1997 International Conference on Solid–State Sensors and Actuators (Chicago, Jun. 16–19, 1997) (Jun. 16–19, 1997).

(List continued on next page.)

*Primary Examiner*—Akm E. Ullah
*Assistant Examiner*—Jennifer Doan
(74) *Attorney, Agent, or Firm*—Blakely, Sokoloff, Taylor & Zafman LLP

(57) ABSTRACT

An optical switch is described having mirrors that are located over an area having an approximate oval shape. Each mirror is pivotable about a first axis and about a second axis transverse to the first axis. Because of the construction and assembly of each mirror, pivoting about the first axis is more limited than pivoting about the second axis. The area over which the mirrors are located is designed to accommodate pivoting about the first axis and about the second axis such that the area has a length and a width wherein the length is much more than the width. In addition, pivoting about the first axis limits pivoting about the second axis and pivoting about the second axis limits pivoting about the first axis. Because pivoting about one axis limits pivoting about another axis, the area over which the mirrors are located has an oval shape as opposed to a rectangular shape.

11 Claims, 3 Drawing Sheets

U.S. PATENT DOCUMENTS

| | | | |
|---|---|---|---|
| 3,649,105 A | | 3/1972 | Treuthart |
| 4,208,094 A | * | 6/1980 | Tomlinson, III et al. ..... 350/96.2 |
| 4,274,712 A | | 6/1981 | Sintes |
| 4,365,863 A | | 12/1982 | Broussaud |
| 4,421,381 A | | 12/1983 | Ueda et al. |
| 4,498,730 A | * | 2/1985 | Tanaka et al. ............ 350/96.16 |
| 4,553,436 A | | 11/1985 | Hansson |
| 4,598,585 A | | 7/1986 | Boxenhorn |
| 4,613,203 A | | 9/1986 | Proetel et al. |
| 4,626,066 A | * | 12/1986 | Levinson .................... 350/96.8 |
| 4,654,663 A | | 3/1987 | Alsenz et al. |
| 4,706,374 A | | 11/1987 | Murakami |
| 4,851,080 A | | 7/1989 | Howe et al. |
| 4,922,756 A | | 5/1990 | Henrion |
| 5,016,072 A | | 5/1991 | Greiff |
| 5,068,203 A | | 11/1991 | Logsdon et al. |
| 5,083,857 A | | 1/1992 | Hornbeck |
| 5,097,354 A | | 3/1992 | Goto |
| 5,121,180 A | | 6/1992 | Beringhause et al. |
| 5,126,812 A | | 6/1992 | Greiff |
| 5,172,262 A | | 12/1992 | Hornbeck |
| 5,198,390 A | | 3/1993 | MacDonald et al. |
| 5,203,208 A | | 4/1993 | Berstein |
| 5,226,321 A | | 7/1993 | Varnham et al. |
| 5,235,187 A | | 8/1993 | Arney et al. |
| 5,247,222 A | | 9/1993 | Engle |
| 5,255,332 A | | 10/1993 | Welch et al. |
| 5,399,415 A | | 3/1995 | Chen et al. |
| 5,428,259 A | | 6/1995 | Suzuki |
| 5,444,566 A | | 8/1995 | Gale et al. |
| 5,449,903 A | | 9/1995 | Arney et al. |
| 5,488,862 A | | 2/1996 | Neukermans et al. |
| 5,524,153 A | | 6/1996 | Laor |
| 5,528,296 A | | 6/1996 | Gove et al. |
| 5,555,558 A | * | 9/1996 | Laughlin ..................... 385/16 |
| 5,563,343 A | | 10/1996 | Shaw et al. |
| 5,581,643 A | | 12/1996 | Wu |
| 5,594,820 A | | 1/1997 | Garel-Jones et al. |
| 5,600,383 A | | 2/1997 | Hornbeck |
| 5,608,468 A | | 3/1997 | Gove et al. |
| 5,610,335 A | | 3/1997 | Shaw et al. |
| 5,628,917 A | | 5/1997 | MacDonald et al. |
| 5,629,790 A | | 5/1997 | Neukermans et al. |
| 5,645,684 A | | 7/1997 | Keller |
| 5,648,618 A | | 7/1997 | Neukermans et al. |
| 5,661,591 A | | 8/1997 | Lin et al. |
| 5,673,139 A | | 9/1997 | Johnson |
| 5,726,073 A | | 3/1998 | Zhang et al. |
| 5,726,815 A | | 3/1998 | Gunter et al. |
| 5,808,780 A | | 9/1998 | McDonald |
| 5,828,800 A | | 10/1998 | Henry et al. |
| 5,872,880 A | | 2/1999 | Maynard |
| 5,912,608 A | | 6/1999 | Asada |
| 5,920,417 A | | 7/1999 | Johnson |
| 5,943,157 A | | 8/1999 | Florence et al. |
| 5,943,454 A | * | 8/1999 | Aksyuk et al. ............... 385/22 |
| 5,960,132 A | | 9/1999 | Lin |
| 5,960,133 A | | 9/1999 | Tomlinson |
| 5,961,767 A | | 10/1999 | Aksyuk et al. |
| 5,969,848 A | | 10/1999 | Lee et al. |
| 5,995,688 A | | 11/1999 | Aksyuk et al. |
| 5,998,816 A | | 12/1999 | Nakaki et al. |
| 5,999,303 A | | 12/1999 | Drake |
| 6,000,280 A | | 12/1999 | Miller et al. |
| 6,002,818 A | | 12/1999 | Fatehi et al. |
| 6,009,219 A | * | 12/1999 | Doyle .......................... 385/23 |
| 6,020,272 A | | 2/2000 | Fleming |
| 6,028,689 A | | 2/2000 | Michalicek et al. |
| 6,028,690 A | | 2/2000 | Carter et al. |
| 6,040,935 A | | 3/2000 | Michalicek |
| 6,044,705 A | | 4/2000 | Nuekermans et al. |
| 6,053,618 A | | 4/2000 | Arpin |
| 6,061,166 A | | 5/2000 | Furlani et al. |
| 6,062,697 A | | 5/2000 | Bryant et al. |
| 6,072,617 A | | 6/2000 | Henck |
| 6,075,239 A | | 6/2000 | Aksyuk et al. |
| 6,075,639 A | | 6/2000 | Kino et al. |
| 6,097,859 A | | 8/2000 | Solgaard et al. |
| 6,097,860 A | | 8/2000 | Laor |
| 6,121,552 A | | 9/2000 | Brosnihan et al. |
| 6,128,121 A | | 10/2000 | Choi et al. |
| 6,137,926 A | | 10/2000 | Maynard |
| 6,239,473 B1 | | 5/2001 | Adams et al. |
| 6,201,631 B1 | | 6/2001 | Greywall |
| 6,245,590 B1 | | 6/2001 | Wine et al. |
| 6,253,001 B1 | | 6/2001 | Hoen |
| 6,256,430 B1 | | 7/2001 | Jin et al. |
| 6,262,827 B1 | | 7/2001 | Ueda et al. |
| 6,278,812 B1 | * | 8/2001 | Lin et al. ...................... 385/18 |
| 6,289,145 B1 | | 9/2001 | Solgaard et al. |
| 6,295,154 B1 | | 9/2001 | Laor et al. |
| 6,320,993 B1 | | 11/2001 | Laor |
| 6,330,102 B1 | | 12/2001 | Daneman et al. |
| 6,396,975 B1 | * | 5/2002 | Wood et al. .................. 385/18 |
| 6,396,976 B1 | | 5/2002 | Little et al. |

FOREIGN PATENT DOCUMENTS

| | | |
|---|---|---|
| EP | 0 813089 A2 | 6/1997 |
| EP | 0 834759 A2 | 4/1998 |
| EP | 0 916983 A1 | 11/1998 |
| EP | 0 980014 A1 | 2/2000 |
| EP | 1 120677 A2 | 8/2001 |
| GB | 2 175705 A | 12/1986 |
| GB | 2 275 787 A | 9/1994 |
| GB | 2 328312 A | 2/1999 |
| JP | 60-107017 | 6/1985 |
| JP | 5-107485 A | 4/1993 |
| JP | 6-180428 | 6/1994 |
| JP | 2000-19434 A | 1/2000 |
| WO | WO 97/04283 | 2/1997 |
| WO | WO99/36941 | 7/1999 |
| WO | WO99/36948 | 7/1999 |
| WO | WO 99/66354 | 12/1999 |
| WO | WO 99/67666 | 12/1999 |
| WO | WO 00/20899 | 4/2000 |
| WO | WO 01/33898 A2 | 5/2001 |

OTHER PUBLICATIONS

Ming C. Wu, "MEMS for Optical and RF Applications."U-CLA Extension, Department of Engineering, Information Systems and Technical Management. Engineering: 853.52, Nov. 1–3, 1999.

Lih Y. Lin and Evan L. Goldstein, "Micro–Electro–Mechanical Systems (MEMs) for WDM Optical Crossconnect Networks,"IEEE, pp. 954–957 (1999).

D.T. Neilson, V. A. Aksyuk, S. Arney, N.R. Basavanhally, K.S. Bhalla, D.J. Bishop, B.A. Boie, C.A. Bolle, J.V. Gates, A.M. Gottileb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum,, L. Zhang, and C.R. Giles, "Fully Provisional 112×112 Micro–Mechanical Optical Crossconnect with 35.8 Tb/s Demonstrated Capacity," OFC 2000 Tech. Dig., Baltimore, Maryland, pp. 202–204 (Mar. 7–10, 2000).

Notification of Transmittal of the International Search Report or the Declaration, PCT (Patent Cooperation Treaty) from the international Searching Authority. (PCT Rule 44.1) From PCT/ISA/220, PCT/US01/16114, Aug. 28, 2002, 7 pages.

* cited by examiner

OPTICAL SWITCH HAVING MIRRORS ARRANGED TO ACCOMMODATE FREEDOM OF MOVEMENT

FIELD OF THE INVENTION

This invention relates to an optical switch.

BACKGROUND OF THE INVENTION

Optical fibers are commonly used in voice and data networks. Optical fibers are often bundled together in an array, each carrying a different signal of light. In certain instances the signals of light carried by the different optical fibers have to be switched from a first path to a second path, for example to work around overcrowded or broken paths. To accomplish this optical fibers are provided as inputs into and outputs from an optical switch. An apparatus for reflecting light from the input optical fibers is located in a path of light being emitted from the input optical fibers. The reflecting apparatus usually has an array of mirrors that are arranged in a manner similar to an arrangement of the input optical fibers. Each mirror reflects light from a respective input optical fiber to a selected output optical fiber.

The construction and assembly of the mirrors causes each mirror to have a range of movement about a first axis and a range of movement about a second axis transverse to the first axis. The ranges of movement must be considered when arranging the mirrors and the optical fibers.

SUMMARY OF THE INVENTION

An optical switch is provided comprising a plurality of input optical fibers, a support structure, a plurality of mirrors, and a plurality of output optical fibers. Each input optical fiber transmits a respective light signal and has an end from which the light signal is emitted. The mirrors are secured to the support structure and each mirror is located in a position wherein a respective light signal being emitted by the respective input optical fiber is reflected by the mirror. The mirror is moveable relative to the support structure for first pivotable movement about a first axis and second pivotable movement about a second axis transverse to the first axis. An angular displacement of each pivotable movement is limited by the support structure. The angular displacement of the first pivotable movement is limited more than the angular displacement of the second pivotable movement. The first axes of the mirrors extend in a first direction and the second axes of the mirrors extend in a second direction. At least 95 percent of all the mirrors are located over an area having a length in the first direction and a width in the second direction wherein the length is larger than the width. Each output optical fiber has an end through which a respective light signal reflected by a respective one of the mirrors enters the output optical fiber for transmission through the output optical fiber. Because pivoting about one axis limits pivoting about another axis, the area over which the mirrors are located has an oval shape as opposed to a rectangular shape.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An optical switch is described having mirrors that are located over an area having a non-circular, e.g. an approximately oval shape. Each mirror also is noncircular, e.g. oval shaped. Each mirror is pivotable about a first axis and about a second axis transverse to the first axis. Because of the construction and assembly of each mirror, pivoting about the first axis is more limited than pivoting about the second axis. The area over which the mirrors are located is designed to accommodate pivoting about the first axis and about the second axis such that the area has a length and a width wherein the length is much more than the width. In addition, pivoting about the first axis limits pivoting about the second axis and pivoting about the second axis limits pivoting about the first axis. Because pivoting about one axis limits pivoting about another axis, the area over which the mirrors are located has an oval shape as opposed to a rectangular shape.

Figure 1:
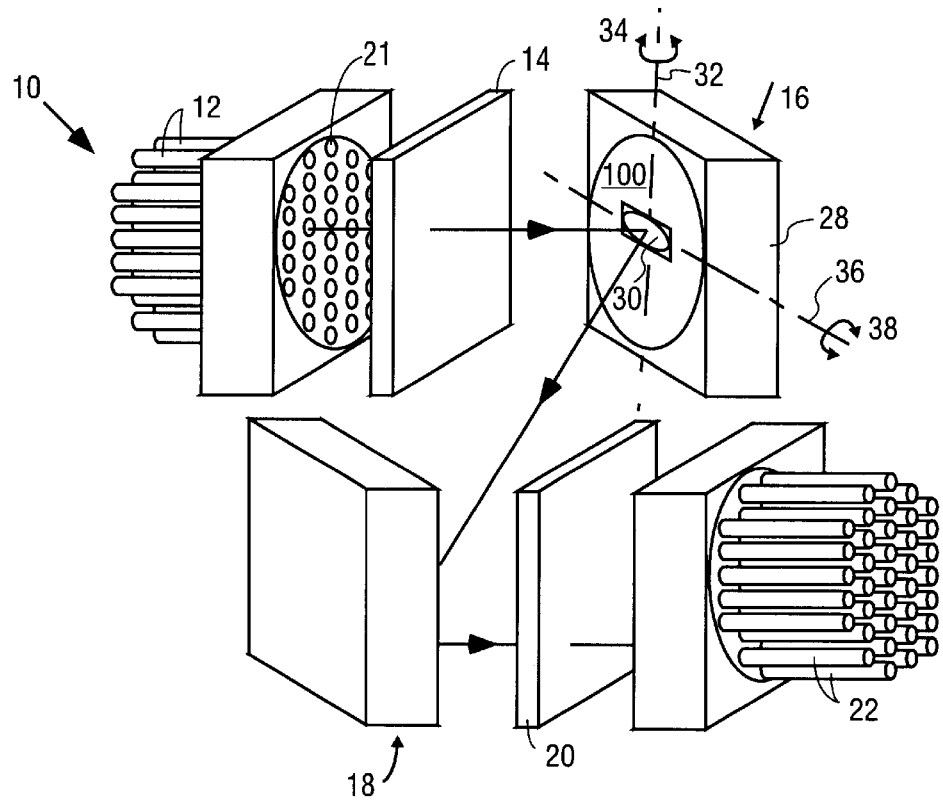
FIG. 1 is a perspective view of an optical switch according to an embodiment of the invention.
Figure 2:
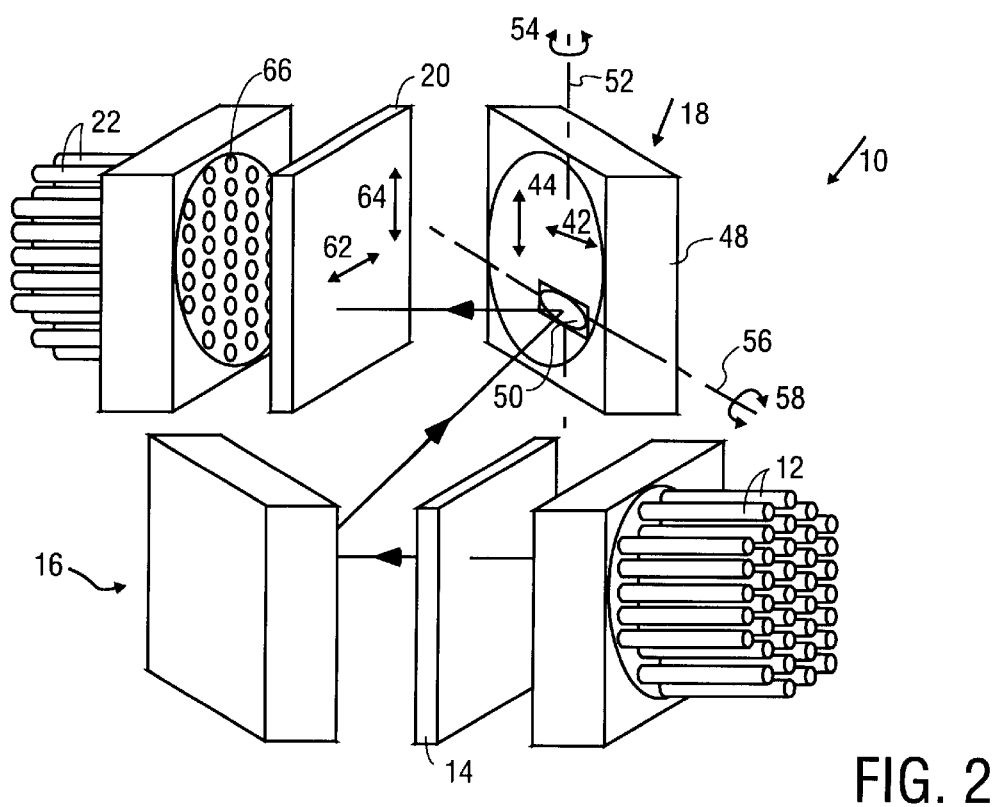
FIG. 2 is a perspective view of the switch from an opposing side.

FIG. 1 and FIG. 2 of the accompanying drawings illustrate an optical switch 10 according to an embodiment of the invention. Light can travel in bidirectionally through the switch 10. For purposes of explanation the switch 10 is now described with respect of light traveling in one direction. The switch 10 includes a plurality of input optical fibers 12, an input lens array 14, input arrangement 16 for reflecting light, output arrangement 18 for reflecting light, an output lens array 20, and a plurality of output optical fibers 22.

The input optical fibers 12 are grouped in an array and each input optical fiber 12 has a respective end 26. A respective light signal is transmitted through a respective one of the input optical fibers 12. The light signal is emitted from the end 26 of the respective input optical fiber 12 through the input lens array 14 to the input arrangement 16.

The input arrangement 16 includes a substrate 28 and a plurality of mirrors 30 (one shown). Each mirror 30 is fabricated on and thereby mounted to the substrate 28 and is pivotable relative to the substrate about a first axis 32 in a direction 34, and pivotable relative to the substrate 28 about a second axis 36 in a direction 38. The axis 36 is at right angles to the axis 32. Each mirror 30 is located in a path of a respective light signal being emitted from a respective one of the input optical fibers 12. A respective light signal is reflected by a respective mirror 30 towards the output arrangement 18. Because of pivoting of the mirror 30 in the direction 34 (FIG. 1), a location where the light signal strikes the output arrangement 18 can be moved in a direction 42 (FIG. 2) and because of pivoting of the mirrors 30 in the direction 38 (FIG. 1), the location can be moved in the direction 44 (FIG. 2).

The output arrangement 18 includes a substrate 48 and a plurality of mirrors 50 (one shown) secured to the substrate 48. By moving the light signal from the input arrangement 16 in the directions 42 and 44, the light signal can be directed to a selected one of the mirrors 50.

Each mirror 50 is pivotable relative to the substrate 48 about an axis 52 in a direction 54 and pivotable relative to the substrate about an axis 56 in a direction 58. The axis 56 is at right angles to the axis 52. A respective light signal is reflected by the respective mirror 50 through the output lens array 20 to the output optical fibers 22. By pivoting the mirror 50 in the direction 54, a location at which the light signal strikes the output lens array 20 can be moved in a direction 62 and by pivoting the mirror in the direction 58 the location can be moved in a direction 64. The mirror 50 can thus be pivoted so that the light signal can be transmitted to a selected one of the output optical fibers 22. The selected one of the output optical fibers 22 to which the light signal is reflected by the mirror is the output optical fiber which is along an optical path with the mirror 50 so that the light signal is reflected by the mirror 50 and enters an end of the selected output fiber 22 in a direction in which the selected output optical fiber 22 extends. Optimal transmission through the selected output optical fiber 22 is so ensured.

Figure 3:
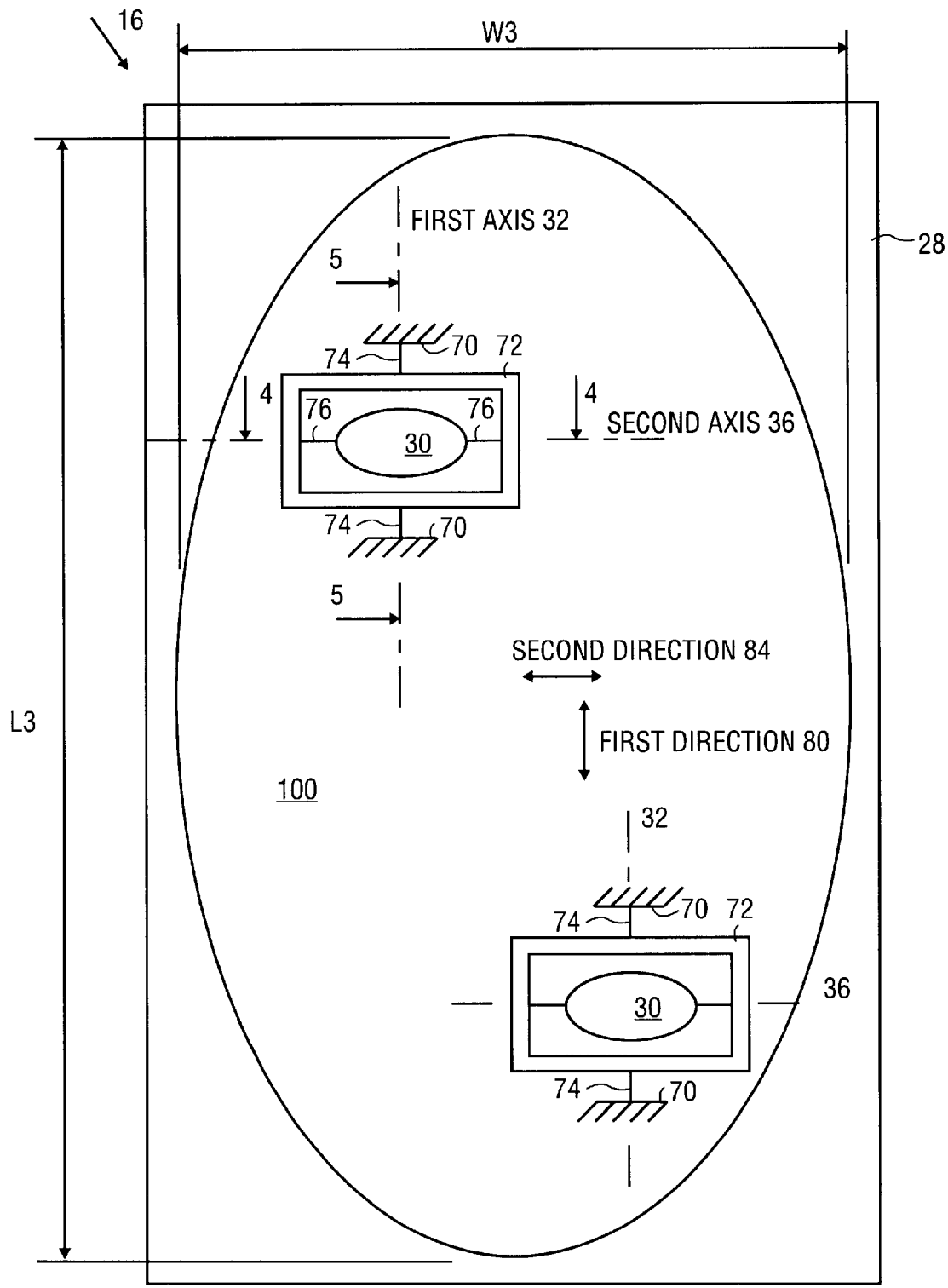
FIG. 3 is a front view of an input arrangement for reflecting light used in the switch.

FIG. 3 illustrates the input arrangement 16 in more detail. It should be noted that the output arrangement 18 is generally identical to the input arrangement 16. The input arrangement 16, in addition to the substrate 28 and the mirrors 30, also includes a plurality of frame elevation components 70, a plurality of support frames 72, a plurality of frame torsion components 74, and a plurality of mirror torsion components 76.

Each support frame 72 is mounted between two frame elevation components 70 with two frame torsion components 74. Each frame torsion component 74 has one end that is secured to a respective frame elevation component 70 and an opposing end that is secured to the support frame 72. The support frame 72 is pivotable about the first axis 32 which extends through the frame torsion components 74. The first axes 32 about which the support frames 72 pivot all extend in a first direction 80.

Each support frame 72 defines an opening and a respective mirror 30 is located within a respective opening of a respective support frame 72. The mirror 30 is secured to the support frame with two mirror torsion components 76 located on either side of the mirror 30. Each mirror torsion component 76 has one end secured to the support frame 72 and an opposing end secured to the mirror 30. The mirror 30 can pivot about the second axis 36 which extends through the mirror torsion components 76. The second axis 36 is at right angles to the first axis 32. The second axes 36 about which the mirrors 30 pivot all extend in a second direction 84.

Figure 4:
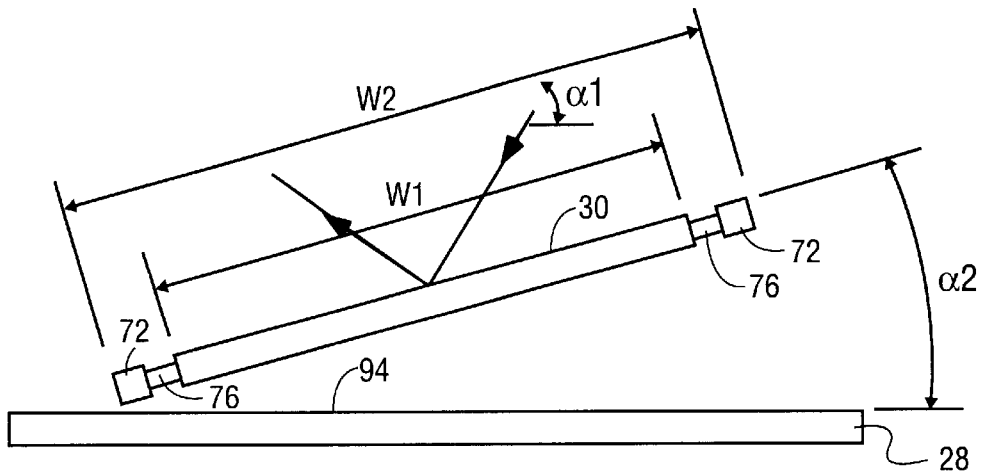
FIG. 4 is a cross-sectional side view on 4—4 in FIG. 3.

Referring to FIG. 4, a light signal strikes the mirror 30 at an angle α1 of, for example, 45° with respect to a plane in which the substrate 28 extends. The light signal typically has a circular cross-section. To ensure that a maximum usable portion of the bundle of light is reflected by the mirror 30, the mirror has a width W1 that is sufficiently large to accommodate and reflect a sufficiently large portion of the light.

Figure 5:
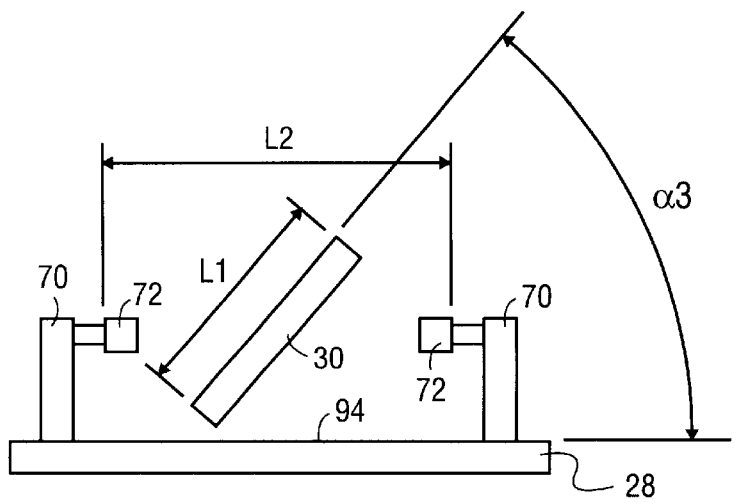
FIG. 5 is a cross-sectional side view on 5—5 in FIG. 3.

Referring also to FIG. 5, the mirror has a length L1 that is much less than the width W1. The length L1 is still sufficient to accommodate and reflect a sufficiently large portion of a cross-section of the light. The optimum ratio of $W_1$ and $L_1$ is the sine of the incident angle $\alpha_1$ when the mirrors are not tilted. In order to accommodate the mirror 30, the frame 72 has a width W2 and a length L2 wherein the width W2 is much larger than the length L2. In addition, the inclusion of the mirror torsion components 76 necessitates a frame 72 having a width W2 that can accommodate the mirror torsion components 76 in addition to the mirror 30 having a width W1.

Because of the relatively large width W2 of the frame 72, the frame 72 can only pivot through an angle α2 before being limited by a surface 94 of the substrate 28. Other aspects, such known in the art as "snap down", also limit pivoting of the mirror. By contrast, because of the relatively short length L1 of the mirror 30, the mirror 30 can pivot through a relatively large angle α3 before being limited by the surface 94 of the substrate 28. The angle α3 is larger than the angle α2. Referring to FIG. 1, the mirror 30 can pivot in the direction 34 by a smaller angle than what the mirror 30 can pivot in the direction 38. Referring now also to FIG. 2, because the mirror can pivot more in the direction 38, the location at which the signal of light strikes the output arrangement 18 can be moved more in the direction 44 than in the direction 42. Referring now also to FIG. 3, because of more freedom of movement in the direction 44 than in the direction 42, all the mirrors 30 are located over an area 100 having a length L3 and a width W3 wherein the length L3 is more than the width W3. The length L3 is typically about 14 mm and the width W3 about 9 mm. For optimal functioning ratio between the width W3 and the length L3 is approximately equal to the ratio of the angle α2 to the angle α3, which is the ratio of the angles that the mirror 30 can tilt about transverse axes. The mirrors 50 are located in an identical arrangement to the mirrors 30 for the same reason. Each one of the mirrors 30 corresponds to a respective one of the input optical fibers 12 so that the input optical fibers 12 are located in an identical arrangement as the mirrors 30. Each one of the output optical fibers 22 corresponds to a respective one of mirrors 50 so that the output optical fibers 22 are located in an identical arrangement as the mirrors 50.

Figure 6:
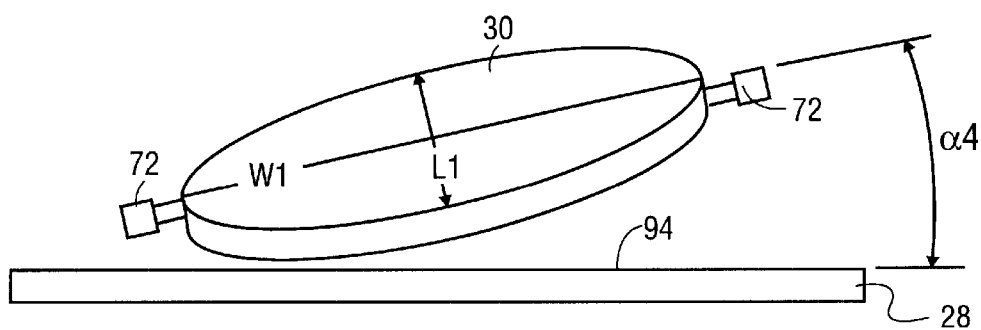
FIG. 6 is a view similar to FIG. 4 illustrating additional movement.

FIG. 6 is a view similar to FIG. 4 wherein the mirror 30 is pivoted while the support frame 72 is pivoted. Because of pivoting of the mirror 30, the support frame 72 can only pivot through an angle α4 before pivoting of the support frame 72 is limited by contact between the mirror 30 and the surface 94 of the substrate 28. The angle α4 is even less than the angle α2 in FIG. 4. Pivoting of the mirror 30 thus further limits pivoting of the support frame 72. In a similar fashion pivoting of the support frame 72 also limits pivoting of the mirror 30. Referring again to FIG. 3, it can be seen that the area 100 has a generally oval shape as opposed to a rectangular, square or circular shape. In the case of a rectangular or square shape it may not be possible to reflect a light signal from a mirror at a corner of the rectangular shape because that may require simultaneous pivoting of both a support frame and a mirror and, as discussed with reference to FIG. 6, that may not be possible. The location of mirrors at corners of a rectangle for typical data-bearing light beams is therefore less preferred than locating all the mirrors for data-bearing channels within an oval area. It should however be noted that a rectangular area may be useful in other embodiments. It should also be noted that the oval shape may differ slightly from an exact oval depending on how pivoting of the mirror in one direction affects pivoting of the mirror about a transverse axis. The exact shape of this "oval area" is chosen to maximize the number of mirrors that each of the input mirrors can be directed to given the limited rotation and coupling between the mirror axes of the mirror.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather that a restrictive sense.

What is claimed:

1. An optical switch comprising:
   a plurality of mirrors secured to a support structure, each mirror being located in a position wherein a respective light signal being emitted by a respective input optical fiber is reflected by the mirror, the mirror being movable relative to the support structure for first pivotable movement about a first axis and second pivotable movement about a second axis transverse to the first axis, an angular displacement of each pivotable movement being limited with the angular displacement of the first pivotable movement being limited to less than the angular displacement of the second pivotable movement, wherein the first axis extends in a first direction and the second axis extends in a second direction and wherein the second axis is at an angle to the light signal being reflected by the mirror and the mirror has a length in the first direction and a width in the second direction, the length being more than the width, the angular displacement of the first pivotable movement being limited to less than the angular displacement of the second pivotable movement which is at least in part due to the length of the mirror being more than the width of the mirror, and wherein at least 95 percent of all the mirrors are located over an area having a length in the first direction and a width in the second direction, the length being larger than the width.

2. The optical switch of claim 1 wherein the angular displacement of the second pivotable movement is more limited when the mirror is pivoted about the second axis than when the mirror is not pivoted about the second axis, the area being substantially oval.

3. The optical switch of claim 1 wherein a ratio between the width and the length is less than 95 percent.

4. The optical switch of claim 1 further comprising a plurality of input optical fibers, each of which being for transmission of a respective light signal and having an end from which the light signal is emitted to a respective one of the mirrors wherein at least 95 percent of the mirrors, when viewed from the area over which the fibers are located, are located over an area substantially corresponding to the area over which the fibers are located.

5. An optical switch comprising:
a plurality of input optical fibers, each for transmission of a respective light signal and having an end from which the light signal is emitted;
a substrate having a surface;
a plurality of support frames, each support frame being secured to a respective frame elevation component for first pivotable movement about a respective first axis, an angular displacement of the first pivotable movement being limited, the first axes extending in substantially a first direction;
a plurality of mirrors, each mirror being located in a position wherein a respective light signal being emitted by a respective input optical fiber is reflected by the mirror and being secured to a respective support frame for second pivotable movement about a respective second axis transverse to the first axis about which the support frame pivots, an angular displacement of the second pivotable movement being limited, the angular displacement of the first pivotable movement being limited to less than the angular displacement of the second pivotable movement, at least 95 percent of all the mirrors being located over an area having a length in the first direction and a width in the second direction, the length being larger than the width, wherein a ratio between the width and the length of the mirror is approximately equal to a sine of an angle between the respective light signal and a plane of the substrate; and
a plurality of output optical fibers, each having an end through which a respective light signal reflected by a respective one of the mirrors enters the output optical fiber for transmission through the output optical fiber.

6. The optical switch of claim 5 wherein the angular displacement of the second pivotable movement is more limited when the mirror is pivoted about the second axis than when the mirror is not pivoted about the second axis, the area being substantially oval.

7. The optical switch of claim 5 wherein at least 95 percent of the second ends of the output optical fibers, when viewed from the area over which the mirrors are located, are located over an area substantially corresponding to the area over which the mirrors are located.

8. An optical switch comprising:
a plurality of mirrors secured to a support structure, each mirror being located in a position wherein a respective light signal being emitted by a respective input optical fiber is reflected by the mirror, the mirror being movable relative to the support structure for first pivotable movement about a first axis and second pivotable movement about a second axis transverse to the first axis, an angular displacement of each pivotable movement being limited with the angular displacement of the first pivotable movement being limited to less than the angular displacement of the second pivotable movement, wherein the first axis extends in a first direction and the second axis extend in a second direction, at least 95 percent of all the mirrors are located over an area having a length in the first direction and a width in the second direction, the length being larger than the width; and
a plurality of support frames, each support frame being pivotally secured to the support structure for pivotable movement about a respective first axis, and a plurality of torsion connectors, each torsion connector having one end secured to a respective support frame and an opposing end secured to a respective mirror, the mirror being pivotable relative to the support frame about the second axis which extends through the torsion component, the angular displacement of the first pivotable movement being limited more than the angular displacement of the second pivotable movement which is at least in part due to the inclusion of the torsion connector.

9. The optical switch of claim 8 wherein the angular displacement of the second pivotable movement is more limited when the mirror is pivoted about the second axis than when the mirror is not pivoted about the second axis, the area being substantially oval.

10. The optical switch of claim 8 wherein a ratio between the width and the length is less than 95 percent.

11. The optical switch of claim 8 further comprising a plurality of input optical fibers, each of which being for transmission of a respective light signal and having an end from which the light signal is emitted to a respective one of the mirrors wherein at least 95 percent of the mirrors, when viewed from the area over which the fibers are located, are located over an area substantially corresponding to the area over which the fibers are located.

* * * * *